United States Patent
Haldar et al.

(10) Patent No.: US 11,615,152 B2
(45) Date of Patent: Mar. 28, 2023

(54) GRAPH-BASED EVENT SCHEMA INDUCTION FOR INFORMATION RETRIEVAL

(71) Applicants: International Business Machines Corporation, Armonk, NY (US); The Board of Trustees of the University of Illinois, Urbana, IL (US)

(72) Inventors: Rajarshi Haldar, Champaign, IL (US); Yu Deng, Yorktown Heights, NY (US); Lingfei Wu, Elmsford, NY (US); Ruchi Mahindru, Elmsford, NY (US); Julia Constanze Hockenmaier, Urbana, IL (US); Sinem Guven Kaya, New York, NY (US)

(73) Assignees: INTERNATIONAL BUSINESS MACHINES CORPORATION, Armonk, NY (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 17/223,774

(22) Filed: Apr. 6, 2021

(65) Prior Publication Data
US 2022/0318316 A1    Oct. 6, 2022

(51) Int. Cl.
*G06F 16/00* (2019.01)
*G06F 16/93* (2019.01)
(Continued)

(52) U.S. Cl.
CPC ............ *G06F 16/93* (2019.01); *G06F 16/211* (2019.01); *G06F 40/205* (2020.01); *G06N 3/04* (2013.01)

(58) Field of Classification Search
CPC ...... G06F 16/93; G06F 16/211; G06F 40/205; G06F 3/04
See application file for complete search history.

(56) References Cited

U.S. PATENT DOCUMENTS 7,143,091 B2    11/2006   Charnock et al.
8,468,244 B2     6/2013   Redlich et al.
(Continued)

OTHER PUBLICATIONS

Ferguson et al., "Semi-Supervised Event Extraction with Paraphrase Clusters," Proceedings of the 2018 Conference of the North American Chapter of the Association for Computational Linguistics: Human Language Technologies, vol. 2 (Short Papers), Jun. 2018, 6 pages.

(Continued)

*Primary Examiner* — Paul Kim
(74) *Attorney, Agent, or Firm* — Amin, Turocy & Watson, LLP

(57) ABSTRACT

Systems, devices, computer-implemented methods, and/or computer program products that facilitate event schema induction from unstructured or semi-structured data. In one example, a system can comprise a processor that executes computer executable components stored in memory. The computer executable components can comprise a schema component and a retrieval component. The schema component can derive an event schema for a document corpus using parsing results obtained from the document corpus. The retrieval component can populate a response to a query with a document of the document corpus using events extracted from the query and the document using the event schema.

20 Claims, 9 Drawing Sheets

(51) Int. Cl.
*G06N 3/04* (2023.01)
*G06F 40/205* (2020.01)
*G06F 16/21* (2019.01)

(56) References Cited

U.S. PATENT DOCUMENTS

2017/0212886 A1* 7/2017 Sarikaya ............... G06F 40/30
2020/0327444 A1* 10/2020 Negi ..................... G06N 3/08
2022/0114346 A1* 4/2022 Galitsky ............... G16H 10/60

OTHER PUBLICATIONS

Gick et al., "Schema Induction and Analogical Transfer," Cognitive Psychology 15, 1-38 (1983), 38 pages.
Chambers, "Event Schema Induction with a Probabilistic Entity-Driven Model," Proceedings of the 2013 Conference an Empirical Methods in Natural Language Processing, D13-1185, Oct. 2013, 11 pages.
Kipf, "Graph Convolutional Networks," https://tkipf.github.io/graph-convolutional-networks/, Sep. 30, 2016, 14 pages.
Zhang et al., "AMR Parsing as Sequence-to-Graph Transduction," Proceedings of the 57th Annual Meeting of the Association for Computational Linguistics, P19-1009, Jul. 2019, 15 pages.
Liu et al., "Open Domain Event Extraction Using Neural Latent Variable Models," arXiv:1906 06947v1 [cs.CL] Jun. 17, 2019, 12 pages.
Agarwal et al., "Method and System for Extracting Temporal Information Corresponding to Artifacts in a Website," An IP.com Prior Art Database Technical Disclosure, IPCOM000200485D, Oct. 15, 2010, 6 pages.
"Extracting Point of Interest Information from Query Logs," An IP.com Prior Art Database Technical Disclosure, IPCOM000252095D, Dec. 15, 2017, 33 pages.
Tracy et al., "Method and System for Inferring Actionable User Interest Data based on Social Event Messaging by Using a Semi-Supervised Model," An IP.com Prior Art Database Technical Disclosure, IPCOM000259050D, Jul. 8, 2019, 3 pages.
Aguilar et al., "A Comparison of the Events and Relations Across ACE, ERE, TAC-KBP, and FrameNet Annotation Standards," Proceedings of the Second Workshop on Events: Definition, Detection, Coreference, and Representation, W14-2907, Jun. 2014, 9 pages.
Baker, "FrameNet: A Knowledge Base for Natural Language Processing," Proceedings of Frame Semantics in NLP: A Workshop in Honor of Chuck Fillmore (1929-2014), W14-3001, Jun. 2014, 5 pages.
Banarescu et al., "Abstract Meaning Representation for Sembanking," Proceedings of the 7th Linguistic Annotation Workshop and Interoperability with Discourse, W13-2322, Aug. 2013, 9 pages.
Bojanowski et al., "Enriching Word Vectors with Subword Information," Transactions of the Association for Computational Linguistics, vol. 5, 2017, 13 pages.
Castelli et al., "The TechQA Dataset," Proceedings of the 58th Annual Meeting of the Association for Computational Linguistics, 2020.acl-main.117, Jul. 2020, 10 pages.
Chambers, "Event Schema Induction with a Probabilistic Entity-Driven Model," Proceedings of the 2013 Conference on Empirical Methods in Natural Language Processing, D13-1185, Oct. 2013, 11 pages.
Chambers et al., "Template-Based Information Extraction without the Templates," Proceedings of the 49th Annual Meeting of the Association for Computational Linguistics: Human Language Technologies, P11-1098, Jun. 2011, 11 pages.
Dai et al., "Deeper Text Understanding for IR with Contextual Neural Language Modeling," SIGIR'19: Proceedings of the 42nd International ACM SIGIR Conference on Research and Development in Information Retrieval, Jul. 21-25, 2019, 4 pages.
Devlin et al., "BERT: Pre-training of Deep Bidirectional Transformers for Language Understanding," Proceedings of the 2019 Conference of the North American Chapter of the Association for Computational Linguistics: Human Language Technologies, vol. 1 (Long and Short Papers), N19-1423, Jun. 2019, 16 pages.
Goodman, "Penman: An Open-Source Library and Tool for AMR Graphs," Proceedings of the 58th Annual Meeting of the Association for Computational Linguistics: System Demonstrations, 2020. acl-demos.35, Jul. 2020, 8 pages.
Hovy et al., "OntoNotes: The 90% Solution," Proceedings of the Human Language Technology Conference of the NAACL, Companion Volume Short Papers, N06-2015, Jun. 2006, 4 pages.
Huang et al., "Liberal Event Extraction and Event Schema Induction," Proceedings of the 54th Annual Meeting of the Association for Computational Linguistics (vol. 1: Long Papers), P16-1025, Aug. 2016, 11 pages.
Kipf et al., "Variational Graph Auto-Encoders," arXiv:1611. 07308v1 [stat.ML] Nov. 21, 2016, 3 pages.
Kipf et al., "Semi-Supervised Classification with Graph Convolutional Networks," ICLR 2017 conference submission, 2017, 14 pages.
Liu et al., "Entity-Duet Neural Ranking: Understanding the Role of Knowledge Graph Semantics in Neural Information Retrieval," Proceedings of the 56th Annual Meeting of the Association for Computational Linguistics (vol. 1: Long Papers), P18-1223, Jul. 2018, 11 pages.
Liu et al., "Jointly Multiple Events Extraction via Attention-based Graph Information Aggregation," PProceedings of the 2018 Conference on Empirical Methods in Natural Language Processing, D18-1156, Oct.-Nov. 2018, 10 pages.
Mikolov et al., "Distributed Representations of Words and Phrases and their Compositionality," Neural and Information Processing System (NIPS) (2013), 9 pages.
Nguyen et al., "Joint Event Extraction via Recurrent Neural Networks," Proceedings of the 2016 Conference of the North American Chapter of the Association for Computational Linguistics: Human Language Technologies, N16-1034, Jun. 2016, 10 pages.
O'Gorman et al., "The New Propbank: Aligning Propbank with AMR through POS Unification," Proceedings of the Eleventh International Conference on Language Resources and Evaluation (LREC 2018), L18-1231, May 2018, 7 pages.
Palmer et al., "The Proposition Bank: An Annotated Corpus of Semantic Roles," Computational Linguistics, vol. 31, Issue 1, Mar. 2005, 36 pages.
Romadhony et al., "Utilizing structured knowledge bases in open IE based event template extraction," Applied Intelligence, 2019; 49 (1): 206, 14 pages.
Schuhmacher et al., "Finding Relevant Relations in Relevant Documents," in Advances in Information Retrieval, pp. 654-660, Cham. Springer International Publishing, 2016, 7 pages.
Soulier et al., "A Collaborative Document Ranking Model for a Multi-faceted Search," Information Retrieval Technology. AIRS 2013. Lecture Notes in Computer Science, vol. 8281, 15 pages.
Vaswani et al., "Attention is All You Need," Advances in Neural Information Processing Systems, vol. 30, 2017, 11 pages.
Walker et al., "ACE 2005 Multilingual Training Corpus," https://catalog.ldc.upenn.edu/LDC2006T06, 2005, 2 pages.

* cited by examiner

Event Schema Pre-defined

Event Type: Change/Modify

| Argument Roles | |
|---|---|
| | Causer of change |
| | Thing changing |
| | End state |
| | Start state |

Event Type: Open Content

| Argument Roles | |
|---|---|
| | Opener |
| | Thing opening |
| | Instrument Used |

Event Type: Set/Edit Configuration

| Argument Roles | |
|---|---|
| | Setter |
| | Thing set |
| | Position/Value set to |

Event Type: Performance Issues

| Argument Roles | |
|---|---|
| | Cause |
| | Performance/Issues on |

Event Extraction Example

Sentence: I noticed that AUTOMATIC value for NUM_IOSERVERS is changed.

Type: Change/Modify
Trigger: changed
Arg-Causer of Change: [NULL]
Arg-Thing Changing: value
Arg-End State: [NULL]
Arg-Start State: [NULL]

FIG. 2

GRAPH-BASED EVENT SCHEMA INDUCTION FOR INFORMATION RETRIEVAL

BACKGROUND

One or more embodiments herein relate to computing devices, and more specifically, to systems, devices, computer-implemented methods, and/or computer program products that facilitate event schema induction from unstructured or semi-structured data.

Answering user queries in technical domains such as information technology (IT) support can involve a domain expert with both knowledge of the hardware components and/or software components mentioned in the user queries and knowledge as to how those components interact. Such knowledge regarding the specific technical issues raised in user queries can be present in technical documents. One example of a dataset containing such technical documents is the TechQA dataset, which comprises a set of query-document pairs. Each query-document pair includes a user query regarding a specific technical issue and a technical document called a Technote that contains a solution to that specific technical issue.

One challenge associated with processing such technical documents (or manuals) is that they are generally lengthy, verbose, and composed of technical language that can be notably distinct from general or conversational language used in other domains like news articles or social media posts. Another challenge is that technical documents often describe multiple entities and actions, which can make it difficult to identify which entity is relevant to answering user queries for anyone other than a domain expert. Another challenge is that a semantic gap can exist between the terminology of a user query and the terminology of the technical document that answers the user query. For example, a user query can state "my laptop does not charge" whereas a title of the relevant technical document can be "System plugged into AC adapter, but battery won't get charged past 50%". In this example and generally, sparse word overlap can exist between a user query and a relevant technical document.

Such challenges can be an impediment to information retrieval systems in identifying technical documents that are relevant to user queries. By way of example, some information retrieval systems employ bag-of-word models such as term frequency-inverse document frequency (TF-IDF) models that can ignore word order in identifying relevant documents. Long Short Term Memory (LSTM) models and Transformer models that some information retrieval systems use can sometime fail to capture the relevant parts of larger documents. Moreover, fine-tuning LSTM models and Transformer models can involve large amounts of labelled data which is generally unavailable for technical documents. In some instances, information retrieval system can attempt to identify relevant technical documents by matching entities (e.g., hardware components and/or software components) extracted from user queries with entities extracted from technical documents. However, matching extracted entities can miss actions involving those entities.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate event schema induction from unstructured or semi-structured data are described.

According to an embodiment, a system can comprise a processor that executes computer executable components stored in memory. The computer executable components can comprise a schema component and a retrieval component. The schema component can derive an event schema for a document corpus using parsing results obtained from the document corpus. The retrieval component can populate a response to a query with a document of the document corpus using events extracted from the query and the document using the event schema. One aspect of such a system is that the system can facilitate inducing an event schema from unstructured or semi-structured data.

In an embodiment, the schema component can derive the event schema for the document corpus by generating vector representations of events using a graph neural network. One aspect of such a system when the parsing results include Abstract Meaning Representation (AMR) graphs is that the system can leverage the inherently graphical structure of the AMR graphs.

According to another embodiment, a computer-implemented method can comprise deriving, by a system operatively coupled to a processor, an event schema for a document corpus using parsing results obtained from the document corpus. The computer-implemented method can further comprise populating, by the system, a response to a query with a document of the document corpus using events extracted from the query and the document using the event schema. One aspect of such a computer-implemented method is that the method can facilitate inducing an event schema from unstructured or semi-structured data.

In an embodiment, the computer-implemented method can further comprise adjusting, by the system, the event schema based on feedback data obtained from usage logs. One aspect of such a computer-implemented method is that the method can facilitate improving a quality of event extraction results obtained using the event schema.

According to another embodiment, a computer program product can comprise a computer readable storage medium having program instructions embodied therewith. The program instructions are executable by a processor to cause the processor to perform operations. The operations can include deriving, by the processor, an event schema for a document corpus using parsing results obtained from the document corpus. The operations can further include populating, by the processor, a response to a query with a document of the document corpus using events extracted from the query and the document using the event schema. One aspect of such a computer program product is that the computer program product can facilitate inducing an event schema from unstructured or semi-structured data.

In an embodiment, the processor can derive the event schema for the document corpus by clustering vector representations of events into a plurality of clusters to identify event types. One aspect of such a computer program product is that the computer program product can facilitate improving event extraction performance by identifying event types that appear more frequently queries and corresponding documents.

DESCRIPTION OF THE DRAWINGS

FIG. 2 illustrates an example, non-limiting application of closed-domain event extraction.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
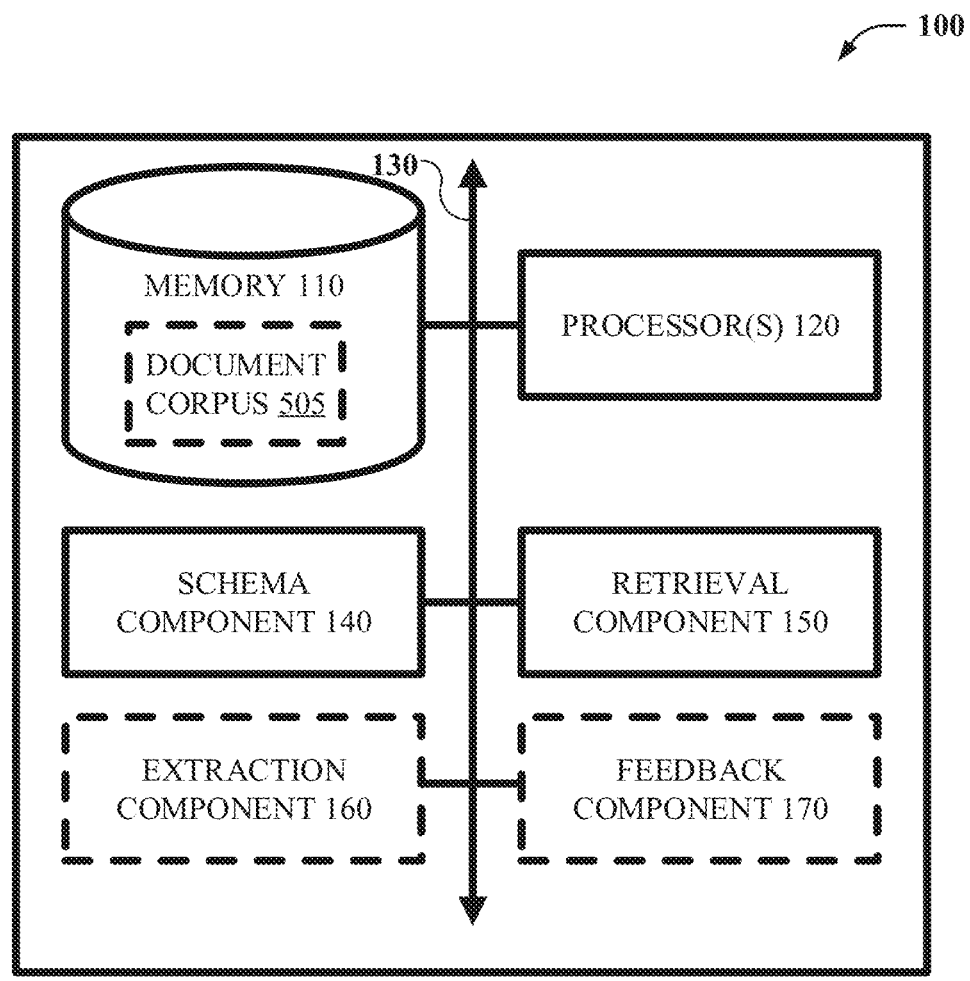
FIG. 1 illustrates a block diagram of an example, non-limiting system that can facilitate event schema induction from unstructured or semi-structured data, in accordance with one or more embodiments described herein.

FIG. 1 illustrates a block diagram of an example, non-limiting system 100 that can facilitate event schema induction from unstructured or semi-structured data, in accordance with one or more embodiments described herein. System 100 includes memory 110 for storing computer-executable components and one or more processors 120 operably coupled via one or more communication busses 130 to memory 110 for executing the computer-executable components stored in memory 110. As shown in FIG. 1, the computer-executable components include schema component 140 and retrieval component 150.

Schema component 140 can derive an event schema for a document corpus 505 using parsing results obtained from the document corpus 505. In an embodiment, schema component 140 can derive the event schema for the document corpus 505 by identifying candidate event triggers and event arguments from the parsing results to form proto-events. In an embodiment, candidate event triggers and event arguments can be identified by filtering Abstract Meaning Representation (AMR) graphs, as discussed in greater detail below with respect to FIG. 5. In an embodiment, schema component 140 can derive the event schema for the document corpus 505 by generating vector representations of events using a graph neural network (GNN). In an embodiment, schema component 140 can derive the event schema for the document corpus 505 by clustering vector representations of events into a plurality of clusters to identify event types. In an embodiment, schema component 140 can cluster the vector representations of events into the plurality of clusters using k-means clustering.

Retrieval component 150 can populate a response to a query with a document of the document corpus 505 using events extracted from the query and the document. In an embodiment, retrieval component 150 can use the event schema to extract the events from the query and the document. In an embodiment, a relevance score can be determined using the events extracted from the query and the document, as discussed in greater detail below with respect to FIG. 9. In an embodiment, retrieval component 150 can populate the response to the query with the document based on the relevance score. In an embodiment, retrieval component 150 can populate the response to the query with a list of documents from the document corpus 505. In an embodiment, retrieval component 150 can order documents within the list of documents based on respective relevance scores.

In an embodiment, system 100 can further include extraction component 160 and feedback component 170. Extraction component 160 can extract the events from the query and the document of the document corpus 505 using the event schema. In an embodiment, extraction component 160 can assign a weight to an extracted event based on a usage frequency of the extracted event by retrieval component 150, a context in which the extracted event appears, or a combination thereof. In an embodiment, extraction component 160 can obtain the usage frequency of the extracted event by retrieval component 150 from a usage log (e.g., a usage log stored in database 860 of FIG. 6). In an embodiment, extraction component 160 can determine the context in which the extracted event appears using surrounding nodes in an AMR graph comprising the extracted event. In an embodiment, an extracted event comprises a list of tuple representations. In an embodiment, a tuple representation in the list of tuple representations is a vector formed by concatenating respective vector representations of an event type, an event trigger, an argument, and an argument role. Feedback component 170 can adjust the event schema based on feedback data obtained from usage logs (e.g., usage logs stored in database 860 of FIG. 8).

FIG. 2 illustrates an example, non-limiting application of closed-domain event extraction. As shown by FIG. 2, closed-domain event extraction generally involves a predefined event schema that includes a number of event types and a corresponding event structure for each event type. For example, the predefined event schema shown in FIG. 2 includes four event types: (i) a "Change/Modify" event type; (ii) an "Open Content" event type; (iii) a "Set/Edit Configuration" event type; and (iv) a "Performance Issues" event type. Closed-domain event extraction further involves an event extractor detecting an event trigger (e.g., a word or a noun) in text that is indicative of an event. In FIG. 2, the event trigger detected by the event extractor corresponds to the word "changed" in the Sentence. Upon detecting an event trigger, the event extractor can identify an event type of the event trigger using the predefined event schema. In FIG. 2, the event extractor identified the event type of the "changed" event trigger as the "Change/Modify" event type using the predefined event schema. Upon identifying the event type, the event extractor can extract all event arguments related to the event type from the text and identify an argument role for each extracted event argument using the predefined event schema. An event argument can be a word or phrase representing an entity participating in an event and an argument role can describe a role that a given event argument plays in the event. In FIG. 2, the event extractor extracted one of the four event arguments in the Sentence related to the "Change/Modify" event type and identified an argument role for the extracted argument (e.g., the Thing Changing event argument role) using the predefined event schema. Of note, each aspect of the closed-domain event extraction by the event extractor of FIG. 2 involves the predefined event schema.

Figure 3:
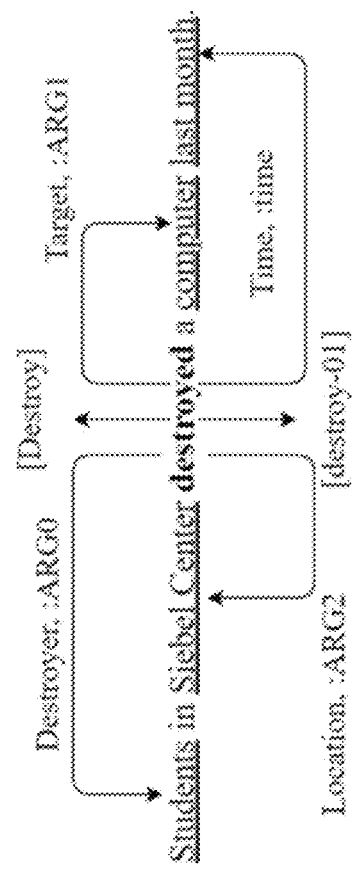
FIG. 3 illustrates an example, non-limiting application of open-domain event extraction.

FIG. 3 illustrates an example, non-limiting application of open-domain event extraction. In contrast to closed-domain event extraction, open-domain event extraction does not involve a predefined event schema. Instead, open-domain event extraction involves converting input sentences into meaning representations or parse trees by extracting event keywords describing an event (e.g., "destroyed", "Students", "Siebel Center", "computer", and "last month") in text and dividing the extracted event keywords into event triggers and event arguments, as shown by FIG. 3. While open-domain event extraction can be implemented without a predefined event schema, other aspects of open-domain event extraction can impede its application in some contexts. For example, open-domain event extraction can sometimes be restricted to identifying relatively simple subject-verb-object triples. As another example, open-domain event extraction can involve sentence parsing frameworks such as Abstract Meaning Representation (AMR) that can be trained on general (e.g., conversational) English language textual data. Application of sentence parsing frameworks trained on general English language textual data to textual data comprising technical language (e.g., technical support documents) can sometimes result in noisy, non-sensical output data.

Figure 4:
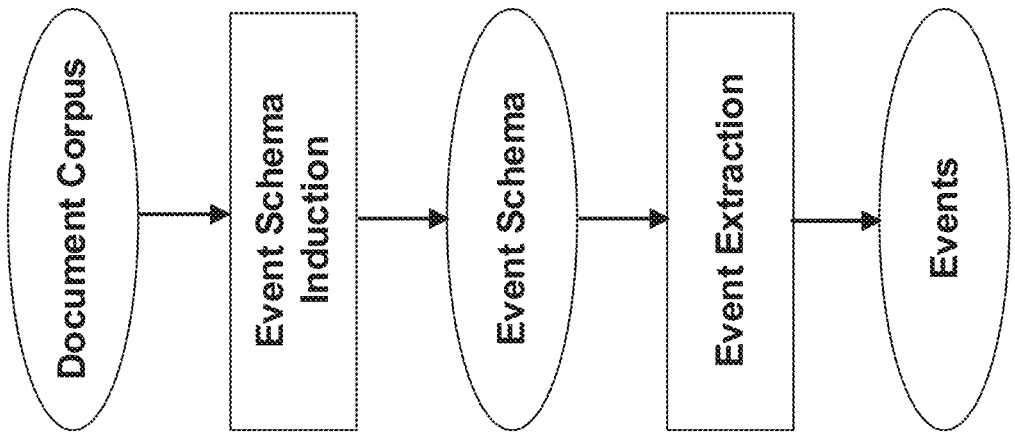
FIG. 4 illustrates an example, non-limiting high-level conceptual overview of a framework for semi-open event extraction, in accordance with one or more embodiments described herein.

FIG. 4 illustrates an example, non-limiting high-level conceptual overview of a framework for semi-open event extraction, in accordance with one or more embodiments described herein. As shown by FIG. 4, one or more embodiments of the disclosed framework can involve two stages. One stage can involve inducing an event schema from a document corpus comprising a set or collection of raw, unstructured documents (e.g., unstructured technical documents). Another stage can involve leveraging the event schema to perform event extraction. For example, leveraging the event schema to perform event extraction can involve generating training data from the document corpus using the event schema. In this example, a machine learning model can be trained to extract events from queries and/or unstructured documents of the document corpus with the training data using semi-supervised or unsupervised machine learning techniques. One or more embodiments of the disclosed framework can leverage advantages of both closed-domain event extraction and open-domain event extraction, as described in greater detail below.

Figure 5:
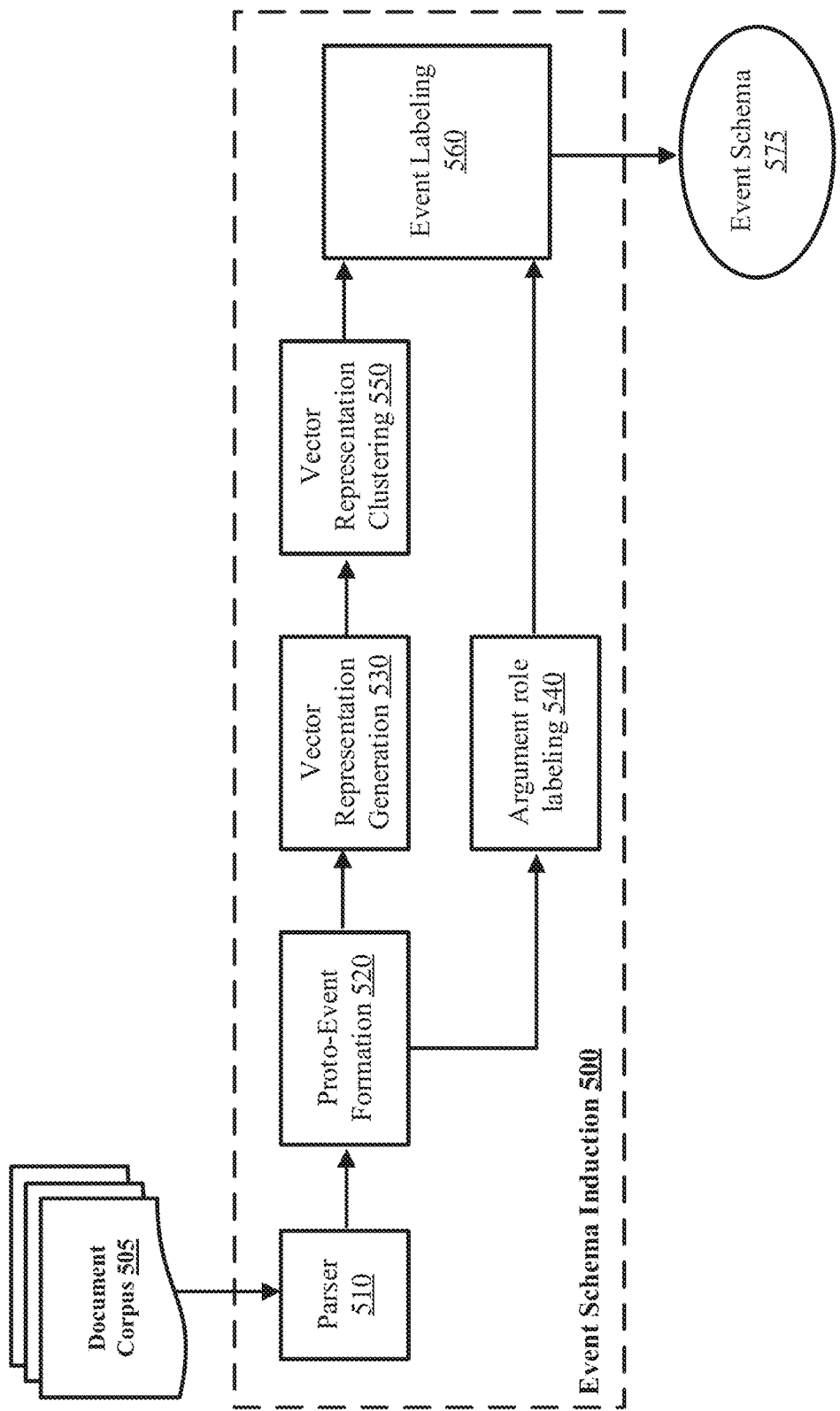
FIG. 5 illustrates an example, non-limiting event schema induction pipeline, in accordance with one or more embodiments described herein.

FIG. 5 illustrates an example, non-limiting event schema induction pipeline 500, in accordance with one or more embodiments described herein. As shown by FIG. 5, event schema induction pipeline 500 includes a parser process 510, a proto-event formation process 520, a vector representation generation process 530, an argument role labeling process 540, a vector representation clustering process 550, and an event labeling process 560. Parser process 510 can convert text of an unstructured document in a set or collection of raw, unstructured documents (document corpus 505) to a semantic representation. In an embodiment, document corpus 505 can comprise a set of raw, unstructured technical documents that can provide solutions to specific technical issues regarding hardware and/or software components. For example, document corpus 505 can include TechQA, a question answering dataset for the technical support domain. The TechQA dataset can comprise two sub-datasets: a QA dataset and a Technotes dataset. The QA dataset can be a labelled dataset that includes a set of query-answer pairs. Each query-answer pair of the QA dataset includes a user query regarding a specific technical issue and an unstructured technical document called a Technote that addresses the specific technical issue.

Parser process 510 can output parsing results comprising the semantic representation to proto-event formation process 520 for further processing. In an embodiment, parser process 510 can be implemented using an Abstract Meaning Representation (AMR) parser. In this embodiment, the parsing results can be obtained using the AMR parser. In this embodiment, the parsing results output by parser process 510 can include a set of AMR graphs that provide a semantic representation for text of an unstructured document. An AMR graph comprising the set of AMR graphs can be a rooted, directed acyclic graph. The following disclosure describes parsing results output by parser process 510 as comprising sets of AMR graphs that provide semantic representations for one or more unstructured documents comprising document corpus 505. However, embodiments of the present disclosure are not so limited. For example, in some embodiments, parser process 510 can be implemented using dependency parse trees or semantic role labeling providing semantic representations for the one or more unstructured documents comprising document corpus 505.

In some instances, parsing results output by parser process 510 comprise AMR graphs that can be irrelevant for answering queries. For example, an AMR graph can include a number of irrelevant AMRs that can arise due to the verbose style and/or length of unstructured documents (e.g., technical documents) comprising document corpus 505. Proto-event formation process 520 can filter irrelevant AMRs from parsing results output by parser process 510 to identify candidate event triggers and event arguments in the parsing results. To filter out irrelevant AMRs, proto-event formation process 520 can extract nodes and edges from an AMR graph comprising the parsing results output by parser process 510. Proto-event formation process 520 can obtain relevant nodes and edges from the extracted nodes and edges using one or more heuristics.

The one or more heuristics can include identifying an extracted node as a relevant node when metadata associated with the extracted node includes a label (e.g., an OntoNotes sense) identifying the extracted node as corresponding to a noun or a verb. In an embodiment, extracted nodes that match both a verbal and a lexical unit in the FrameNet corpus can be considered candidate event triggers. The relevant nodes obtained from the extracted nodes can be referred to as candidate event triggers and candidate event arguments. The one or more heuristics can further include identifying an extracted edge as a relevant edge when metadata associated with the extracted edge includes a label (e.g., AMR role) identifying the extracted node as corresponding to a specific subset of semantic relations or roles. For example, proto-event formation process 520 can identify an extracted edge as a relevant edge when metadata associated with the extracted edge includes an AMR role of ARG0, ARG1, ARG2, or ARG3 (see FIG. 3). In an embodiment, parser process 510 can generate the metadata associated with the extracted nodes and/or extracted edges. A subset of AMR graphs comprising relevant nodes and relevant edges can form proto-events that proto-event formation process 520 can output to vector representation generation process 530 and/or argument role labeling process 540 for further processing. Example proto-events will be discussed in greater detail below with respect to FIGS. 6-7.

Vector representation generation process 530 can generate vector representations of proto-events output by proto-event formation process 520 to facilitate grouping similar proto-events together. In an embodiment, vector representation generation process 530 can generate vector representations of proto-events using a graph neural network. Generating vector representations of proto-events using graph neural networks can facilitate leveraging the inherently graphical structure of AMR graphs (or AMR parse trees). By way of example, vector representation generation process 530 can generate vector representations of proto-events using a graph neural network model (GNN). In an embodiment, the GNN can be a graph auto-encoder such as a variational graph auto-encoder (VAE). One skilled in the art will understand graph auto-encoders as trainable GNNs that can be used for unsupervised learning, clustering, and link prediction on graphs. In an embodiment, the GNN can provide an embedding of each node (e.g., an event trigger and/or event argument) comprising the proto-event.

Vector representation generation process 530 can use mean-pooling to compute a combined vector representing event arguments of a proto-event from the embedding of each node comprising the proto-event. For example, a proto-event can include an event trigger t and event arguments $a_1, a_2, \ldots, a_n$. In this example, vector representation generation process 530 can compute a combined vector representing the event arguments of the proto-event using the function defined by Equation 1:

$$v_a = v_1 + v_2 \ldots + v_n)/n \qquad \text{Equation 1.}$$

In accordance with Equation 1, $v_a$ denotes the combined vector representing the event arguments of the proto-event; $v_1$, $v_2$, and $v_n$ denote vector representations of event arguments $a_1$, $a_2$, and $a_n$, respectively; and n denotes a number of event arguments comprising the proto-event. Vector representation generation process 530 can use concatenation to compute a combined vector representing the proto-event using the function defined by Equation 2:

$$v_e = [v_t, v_a] \qquad \text{Equation 2.}$$

In accordance with Equation 2, $v_e$ denotes the combined vector representing the proto-event and $v_t$ denotes a vector representation of the event trigger.

Argument role labeling process 540 can determine an argument role label for each candidate event argument comprising a proto-event output by proto-event formation process 520 with using an external knowledge database. By way of example, argument role labeling process 540 can evaluate metadata associated with a relevant edge associated with a given candidate event argument. In this example, argument role labeling process 540 can map a label (e.g., AMR role) comprising the metadata to a corresponding argument role label (e.g., PropBank role) using mapping data of the external knowledge database.

Vector representation clustering process 550 can group similar proto-events together in clusters by applying a clustering algorithm to vector representations of proto-events $v_e$ output by vector representation generation process 530. Application of the clustering algorithm can partition the vector representations of proto-events $v_e$ output by vector representation generation process 530 into a number (e.g., 20) of clusters. Each cluster can comprise vector representations of proto-events $v_e$ corresponding to similar proto-events that belong to a given event type. In an embodiment, the clustering algorithm can be a k-means clustering algorithm where the vector representations of proto-events $v_e$ output by vector representation generation process 530 can be partitioned into k different clusters that can each comprise an approximately equal number of the vector representations of proto-events $v_e$. In this embodiment, each cluster can be represented by a centroid point corresponding to an average of all vector representations of proto-events $v_e$ comprising that cluster. In an embodiment, the clustering algorithm can be a k-medoids clustering algorithm where the vector representations of proto-events $v_e$ output by vector representation generation process 530 can be partitioned into k different clusters that can each comprise an approximately equal number of the vector representations of proto-events $v_e$. In this embodiment, each cluster can be represented by a centroid point corresponding to one of the vector representations of proto-events $v_e$ comprising that cluster.

Event labeling process 560 can generate an event type label and one or more argument role slots for each cluster of vector representations of proto-events $v_e$ output by vector representation generation process 530 to derive event schema 575. To that end, event labeling process 560 can identify a candidate event trigger that is representative of all or a substantial portion of proto-events associated with a given cluster of vector representations of proto-events $v_e$. Event labeling process 560 can evaluate a number of criteria to identify a candidate event trigger for a given cluster of vector representations of proto-events $v_e$. For example, an occurrence frequency of the candidate event trigger within the given cluster should exceed a defined threshold, occurrence frequencies of the candidate event trigger in the remaining clusters should fail to breach a defined threshold, and/or the candidate event trigger should satisfy a defined minimum relevancy for use in downstream tasks (e.g., document retrieval, question answering, and/or document summarization).

To facilitate identifying candidate event triggers, event labeling process 560 can compute a distinguishing score for each event trigger-cluster pair comprising the vector representations of proto-events $v_e$ output by vector representation generation process 530 using the function defined by Equation 3:

$$s(t,c) = \ln P(t|c) - \ln P(t) + \lambda(c_o + c_t + c_q) \qquad \text{Equation 3.}$$

In accordance with Equation 3, s(t, c) denotes a distinguishing score for a given event trigger-cluster pair, P (t|c) denotes a conditional probability of getting an event trigger in a cluster, λ denotes a hyper-parameter, $c_o$ denotes a number of times the event trigger appears in a query as well as its corresponding unstructured document in document corpus 505 (e.g., a query and a corresponding Technote in the QA dataset), $c_t$ denotes a number of times the event trigger appears in a unstructured document in document corpus 505 (e.g., a Technote in the QA dataset), and $c_q$ denotes a number of times the event trigger appears in a query in document corpus 505 (e.g., a query in the QA dataset). In an embodiment, P(t|c) can be calculated from a frequency of event triggers in each cluster. In an embodiment, computing the distinguishing score for the given event trigger-cluster pair can further involve a conditional probability of the event trigger belonging in the cluster or P(c|t). In an embodiment, P(c|t) can be calculated from the relative occurrences of a particular event trigger in each cluster.

Event labeling process 560 can generate a set of event triggers for each cluster of vector representations of proto-events $v_e$ using the distinguishing scores. For example, event labeling process 560 can arrange distinguishing scores for event triggers comprising a given cluster in descending order. In this example, event labeling process 560 can generate a set of event triggers for the given cluster by selecting a certain number (e.g., 10) of the event triggers associated with the highest distinguishing scores. An entity (e.g., a machine learning model or a subject matter expert) can identify a candidate event trigger for each cluster of vector representations of proto-events $v_e$ for a corresponding set of event triggers that best represents proto-events comprising that cluster.

Deriving an event schema 575 for a given cluster of vector representations of proto-events $v_e$ can involve event labeling process 560 assigning a candidate event trigger identified for the given cluster as an event type for the given cluster in event schema 575. Deriving the event schema 575 for the given cluster can also involve event labeling process 560 determining one or more argument role slots for the given cluster in event schema 575. Event labeling process 560 can determine the one or more argument role slots by identifying unions between argument role (e.g., PropBank role) occurrences in proto-events comprising the candidate event trigger. Deriving the event schema 575 can also involve event labeling process 560 associating argument role labels output by argument role labeling process 540 with each argument role slot.

Figure 6:
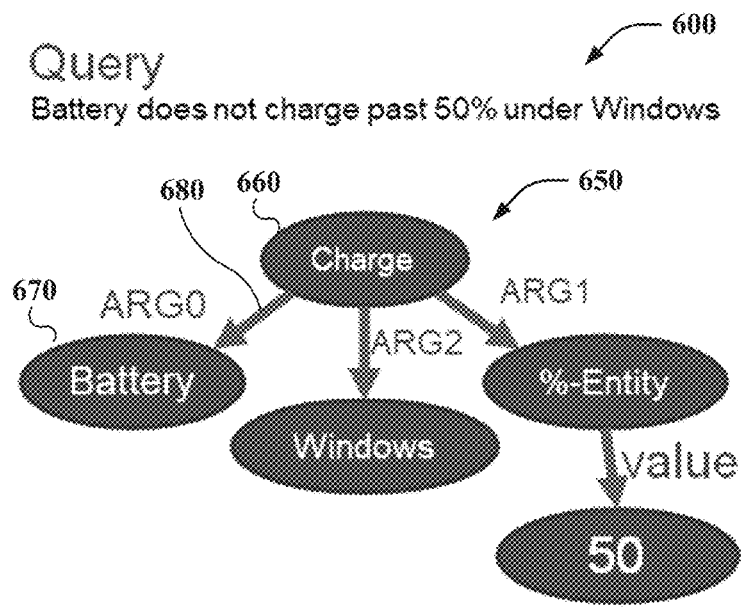
FIG. 6 illustrates an example, non-limiting AMR graph comprising a single proto-event, in accordance with one or more embodiments described herein.

FIG. 6 illustrates an example, non-limiting AMR graph 650 comprising a single proto-event, in accordance with one or more embodiments described herein. AMR graph 650 can be output by proto-event formation process 520 using parsing results that correspond to query 600. As shown by FIG. 6, AMR graph 650 can include a root node 660 and a number of sub nodes (e.g., sub node 670) connected to root node 660 via edges (e.g., edge 680). Root node 660 can be an event trigger in query 600 indicative of an event. The event trigger can be a specific word or phrase in query 600 representing an action or something being performed in query 600. For example, the word "charge" of root node 660 can represent the action being performed in query 600. A sub node can be an event argument that represents an entity participating in the action in query 600 that corresponds to the event trigger. An edge can include an argument role (e.g., an AMR role) that can describe a role that a given event argument plays in the event of query 600 identified by the event trigger. For example, the word "battery" of sub node 670 can be an entity participating in the "charge" action represented by root node 660. In this example, sub node 670 is connected to root node 660 by an edge 680 that includes an argument role of ARG0. That argument role of edge 680 describes the role of the "battery" entity represented by sub node 670 as being a subject of the "charge" action represented by root node 660.

Figure 7:
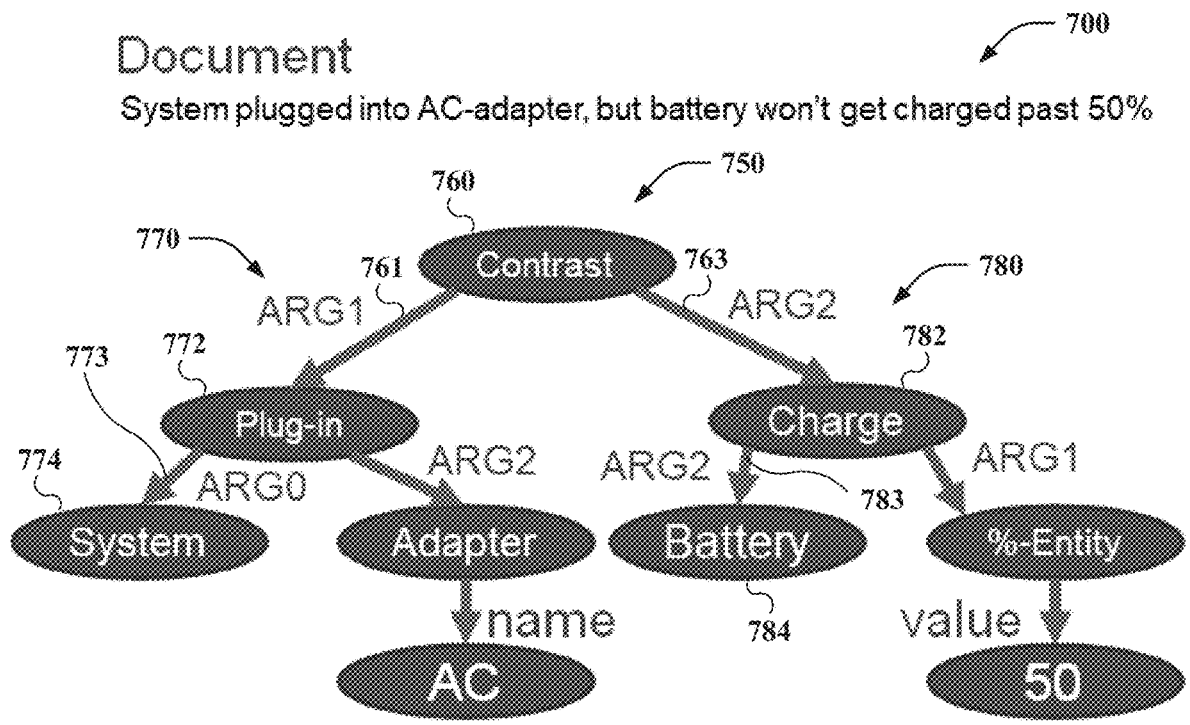
FIG. 7 illustrates an example, non-limiting AMR graph comprising multiple proto-events, in accordance with one or more embodiments described herein.

FIG. 7 illustrates an example, non-limiting AMR graph 750 comprising multiple proto-events, in accordance with one or more embodiments described herein. AMR graph 750 can be output by proto-event formation process 520 using parsing results that correspond to unstructured document 700. As shown by FIG. 7, AMR graph 750 can include a root node 760 and a number of sub nodes (e.g., sub nodes 772, 774, 782, and/or 784) connected to root node 760 via edges (e.g., edges 761, 763, 773, and/or 783). Root node 760 can be a contrast word (e.g., a conjunction word) in unstructured document 700 indicating that multiple events are present in unstructured document 700. For example, unstructured document 700 includes the conjunction word "but" indicating that multiple events are present in unstructured document 700. A pruning operation performed on AMR graph 750 can remove root node 760 to partition AMR graph 750 into multiple AMR graphs. Those multiple AMR graphs can include: (i) a first AMR graph 770 with sub node 772 becoming a first root node for the first AMR graph 770; and (ii) a second AMR graph 780 with sub node 782 becoming a second root node for the second AMR graph 780.

First AMR graph 770 can comprise a first proto-event with sub node 772 being a first event trigger in unstructured document 700. The word "system" of sub node 774 can be an entity participating in the "plug-in" action represented by sub node 772. Sub node 774 is connected to sub node 772 by an edge 773 that includes an argument role of ARG0. That argument role of edge 773 describes the role of the "system" entity represented by sub node 774 as being a subject of the "plug-in" action represented by sub node 772. Second AMR graph 780 can comprise a second proto-event with sub node 782 being a second event trigger in unstructured document 700. The word "battery" of sub node 784 can be an entity participating in the "charge" action represented by sub node 782. Sub node 784 is connected to sub node 782 by an edge 783 that includes an argument role of ARG2. That argument role of edge 783 describes the role of the "battery" entity sub by sub node 784 as being a secondary object of the "charge" action represented by sub node 782.

Figure 8:
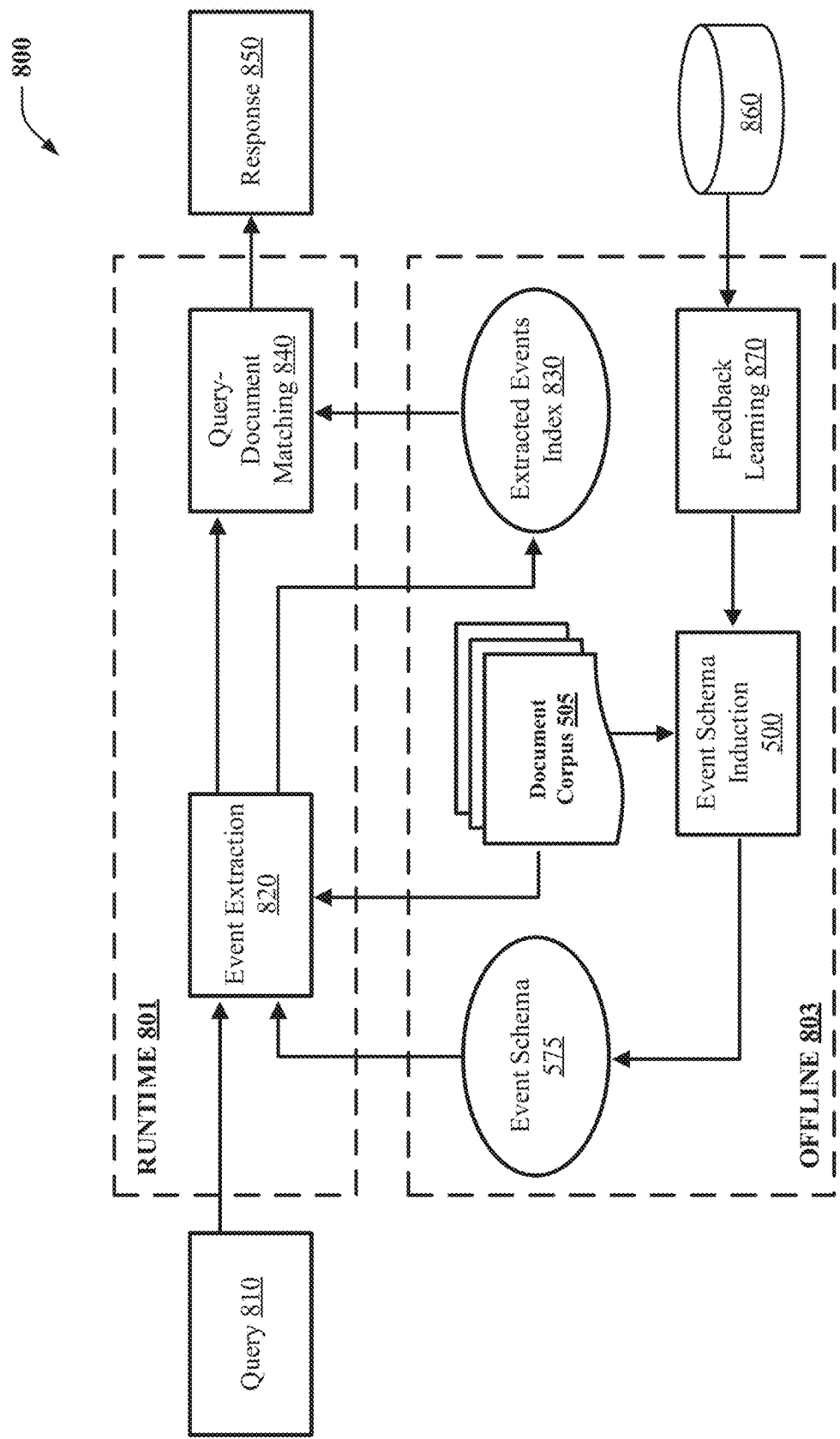
FIG. 8 illustrates an example, non-limiting architecture to implement a framework for retrieving documents using event extraction, in accordance with one or more embodiments described herein.

FIG. 8 illustrates an example, non-limiting architecture 800 to implement a framework for retrieving documents using event extraction, in accordance with one or more embodiments described herein. As shown by FIG. 8, architecture 800 includes a runtime component 801 and an offline component 802. Runtime component 801 includes an event extraction process 820 and a query-document matching process 840. Event extraction process 820 can be a machine learning model trained to extract events from a query 810 and/or an unstructured document in document corpus 505. Event schema 575 can be leveraged to train event extraction process 820.

To that end, event schema induction pipeline 500 can generate training data by labeling a given proto-event output by proto-event formation process 520 with a corresponding event type that event labeling process 560 assigned to a respective cluster of vector representations of proto-events $v_e$ comprising that proto-event. Generating training data can also involve event schema induction pipeline 500 mapping one or more AMR roles of the given proto-event to corresponding argument role slots that event labeling process 560 determined for the respective cluster. Upon mapping the one or more AMR roles of the given proto-event to the corresponding argument role slots and labeling the given proto-event with the corresponding event type, the given proto-event can be added to the training data. Event extraction process 820 can be trained to extract events from queries and/or unstructured documents of document corpus 505 with that training data using any known semi-supervised or unsupervised machine learning technique.

In operation, a query 810 can be submitted to runtime component 801 by an entity (e.g., a user device). By way of example, query 810 can be a user query regarding a specific technical issue. Runtime component 801 can output a response 850 comprising one or more unstructured documents of document corpus 505 that are relevant to query 810. Query-document matching process 840 can identify the one or more unstructured documents that are relevant to query 810 using events. The events that query-document matching process 840 uses to identify the one or more unstructured documents can include an event that event extraction process 820 extracts from query 810 and an event extracted from a candidate document of document corpus 505. A "candidate document" can denote a particular unstructured document of document corpus 505 that along with query 810 forms a query-document pair. In an embodiment, event extraction process 820 can provide query-document matching process 840 with the event extracted from the candidate document. In this embodiment, event extraction process 820 can retrieve the candidate document from document corpus 505 while runtime component 801 is processing query 810. In an embodiment, query-document matching process 840 can obtain the event extracted from the candidate document from extracted events index 830. In this embodiment, event extraction process 820 can populate extracted events index 830 with events extracted from unstructured documents of document corpus 505 before runtime component 801 processes query 810.

Query-document matching process 840 can determine a relevance score for a query-document pair to evaluate a relevancy of a candidate document of the query-document pair to query 810, as described in greater detail below with respect to FIG. 10. In an embodiment, query-document matching process 840 can determine relevance scores for multiple query-document pairs. In an embodiment, query-document matching process 840 can evaluate the relevance scores to identify a particular query-document pair that is associated with a highest relevance score among the multiple query-document pairs. In this embodiment, query-document matching process 840 can populate response 850 with a given candidate document of the particular query-document pair that is associated with the highest relevance score. In an embodiment, query-document matching process 840 can generate a ranked list of candidate documents comprising candidate documents of the multiple query-document pairs. In this embodiment, query-document matching process 840 can arrange candidate documents within the ranked list of candidate documents in ascending order or descending order using the relevance scores for the multiple query-document pairs. In this embodiment, query-document matching process 840 can populate response 850 with a subset of candidate documents from the ranked list of candidate documents. For example, the subset of candidate documents can include a certain number (e.g., 10) of candidate documents that are associated with the highest relevance scores among the relevance scores determined for the multiple query-document pairs.

Feedback learning process 870 can interact with event schema induction pipeline 500 to adjust event schema 575 based on feedback data obtained from one or more usage logs stored in database 860. By way of example, feedback learning process 870 can determine an adjustment value for distinguishing scores based on the feedback data. In an embodiment, the adjustment value can correspond to hyper-parameter λ of Equation 3. In this embodiment, feedback learning process 870 can determine the adjustment value by modifying hyper-parameter λ such that events appearing more frequently in the one or more usage logs are assigned higher weights. In this example, feedback learning process 870 can provide event labeling process 560 of event schema induction pipeline 500 with the adjustment value. Event labeling process 560 can compute new distinguishing scores for event trigger-cluster pairs based on the adjustment value. One or more event types of event schema 575 can be updated based on the new distinguishing scores. In an embodiment, the feedback data can include user feedback data sent to database 860 from a computing device receiving response 850. In an embodiment, the feedback data can include data regarding interactions between a computing device receiving response 850 and the one or more unstructured documents of document corpus 505 included in response 850. In an embodiment, adjusting event schema 575 based on the feedback data can facilitate improving the quality of event extraction results obtained using event schema 575.

Figure 9:
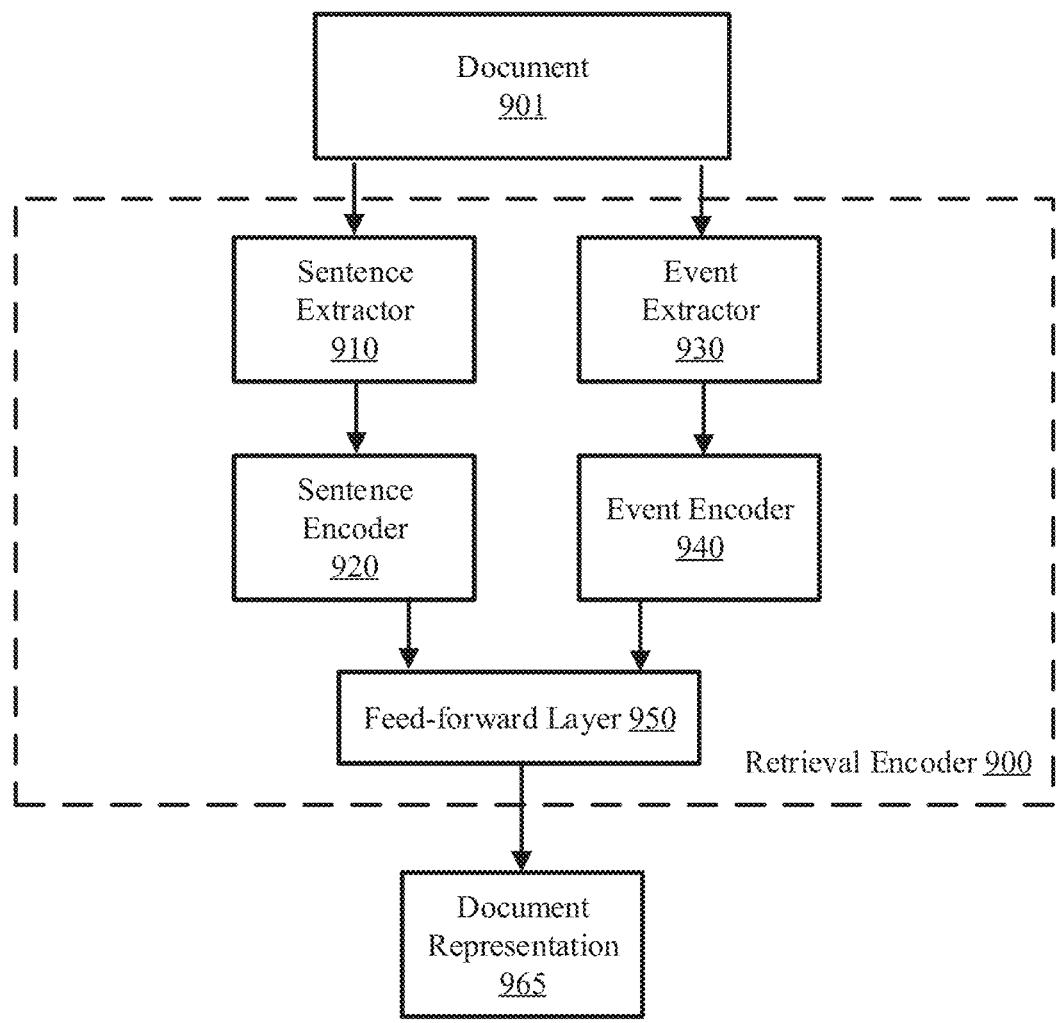
FIG. 9 illustrates application of an example, non-limiting retrieval encoder, in accordance with one or more embodiments described herein.

FIG. 9 illustrates application of an example, non-limiting retrieval encoder 900 to encode unstructured documents into vector representations, in accordance with one or more embodiments described herein. As shown by FIG. 9, retrieval encoder 900 includes a sentence extractor 910, a sentence encoder 920, an event extractor 930, an event encoder 940, and a feed-forward layer 950. Sentence extractor 910 can process document 901 to generate a list of sentences representing sentence-level features extracted from document 901. A sentence of the list of sentences generated by sentence extractor 910 can include a list of word vectors representing that sentence of document 901. A word vector $v_w$ of the list of word vectors can be formed by projecting (or mapping) words of a given sentence to pre-trained word vectors. In an embodiment, words of a given sentence can be projected to pre-trained word vectors using a pre-trained GLoVe model or a pre-trained FastText model. Sentence encoder 920 can generate a sentence-level representation of document 901 using the list of sentences generated by sentence extractor 910. The sentence-level representation of document 901 can be a fixed-length vector $v_s$ representing a sequence of words comprising document 901. In an embodiment, sentence encoder 920 can include a transformer encoder-decoder model comprising a series of encoders where each encoder can be a self-attention layer followed by a fully connected layer that can generate vector $v_s$.

Event extractor 930 can process document 901 to generate a list of events representing event-level features extracted from document 901. An event of the list of events generated by event extractor 930 can include a list of tuples representing that event of document 901. A tuple of the list of tuples can be represented by a vector formed by concatenation of four vectors $(v_t, v_r, v_a, v_l)$, where $v_t$ can be a vector corresponding to an event type, $v_r$ can be a vector representing an event trigger, $v_a$ can be a vector representing an event argument, and $v_l$ can be a vector representing an argument role. In an embodiment, event extractor 930 can comprise event extraction process 820. Event encoder 940 can generate an event-level representation of document 901 using the list of events generated by event extractor 930. The event-level representation of document 901 can be a fixed-length vector $v_E$ representing a sequence of events comprising document 901. In an embodiment, event encoder 940 can include a transformer encoder-decoder model comprising a series of encoders where each encoder can be a self-attention layer followed by a fully connected layer that can generate vector $v_E$. In an embodiment, event encoder 940 can include a Long Short Term Memory (LSTM)

network. Feed-forward layer 950 can generate document representation 965 using the vector $v_s$ generated by sentence encoder 920 and the vector $v_E$ generated by event encoder 940. Document representation 965 can be an aggregated vector $v_D$ representing document 901 that can be formed by concatenating vector $v_s$ and vector $v_E$ using the function defined by Equation 4:

$$v_D = f(v_s; v_E) \quad \text{Equation 4.}$$

Figure 10:
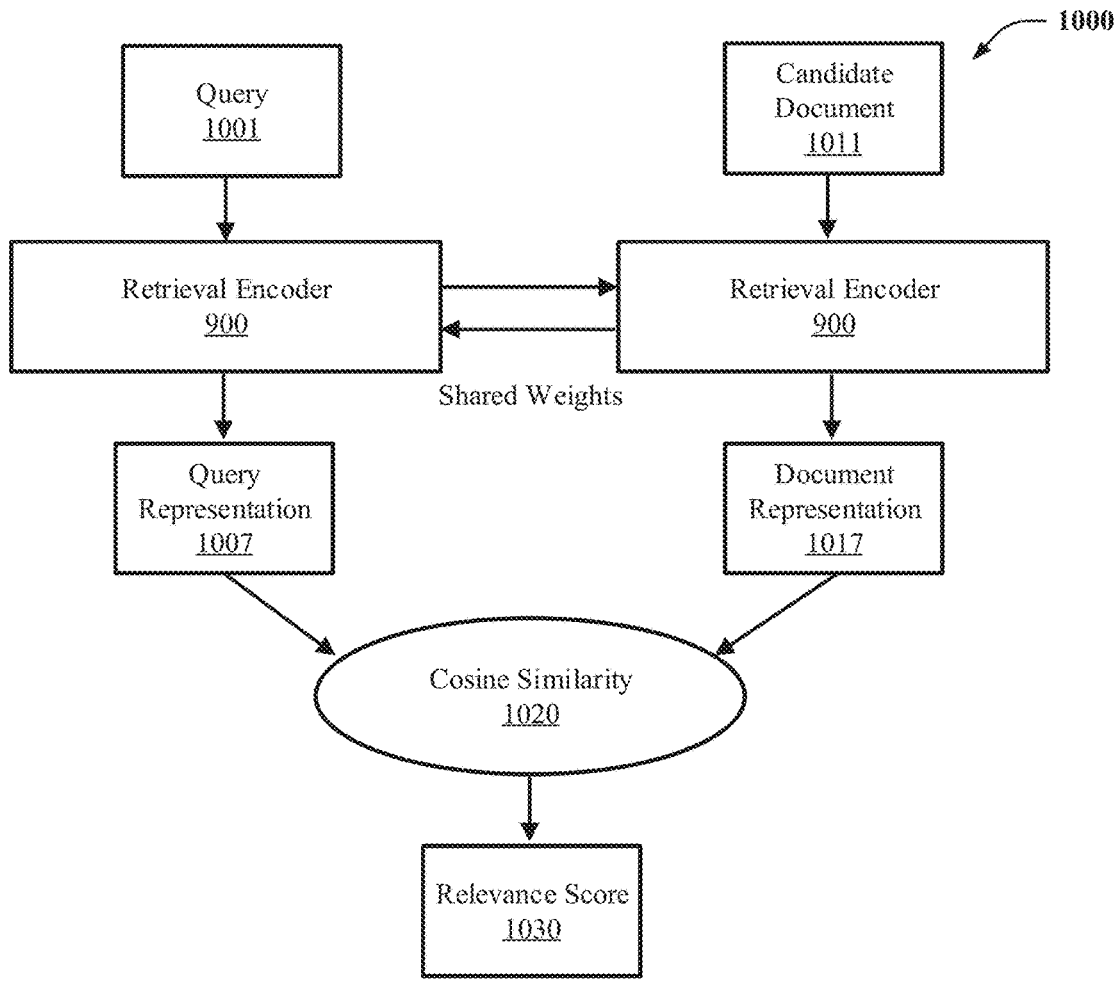
FIG. 10 illustrates an example, non-limiting framework that can facilitate determining relevance scores for query-document pairs, in accordance with one or more embodiments described herein.

FIG. 10 illustrates an example, non-limiting framework 1000 that can facilitate determining relevance scores for query-document pairs, in accordance with one or more embodiments described herein. Framework 1000 can receive a query-document pair comprising a query 1001 and a candidate document 1011 that is potentially relevant to query 1001. By way of example, query 1001 can be a user query regarding a specific technical issue and candidate document 1011 can be an unstructured document in document corpus 505 that potentially addresses the specific technical issue.

FIG. 10 shows that query 1001 and candidate document 1011 can each provide input to an instance of retrieval encoder 900 to obtain a query representation 1007 and a document representation 1017. Query representation 1007 can be an aggregated vector $v_Q$ representing query 1001. That aggregated vector representing query 1001 can be formed by concatenating a first vector obtained by extracting sentence-level features of query 1001 and a second vector obtained by extracting event-level features of query 1001. Document representation 1017 can be an aggregated vector $v_D$ representing candidate document 1011. That aggregated vector representing candidate document 1011 can be formed by concatenating a first vector obtained by extracting sentence-level features of candidate document 1011 and a second vector obtained by extracting event-level features of candidate document 1011.

FIG. 10 also shows that weight values can be shared between the instances of retrieval encoder 900 that process query 1001 and candidate document 1011. Sharing weight values between those instances of retrieval encoder 900 can facilitate obtaining aggregated vector representations of query 1001 and candidate document 1011 that are encoded in a joint embedding space. A cosine similarity process 1020 can determine a relevance score 1030 for the query-document pair with query representation 1007 and document representation 1017 using the function defined by Equation 5:

$$P(\text{relevant}|Q,D) = \text{cosine}(v_Q, v_D) \quad \text{Equation 5.}$$

In accordance with Equation 5, Q denotes a query of a query-document pair, D denotes a candidate document of the query-document pair, and P(relevant|Q, D) denotes a relevance score for the query document pair. Relevance score 1030 can be a value from 0 to 1. When the value of relevance score 1030 is 0, candidate document 1011 can be completely irrelevant to query 1001. When the value of relevance score 1030 is 1, candidate document 1011 can be extremely relevant to query 1001. When the value of relevance score 1030 is between 0.5 and 1, candidate document 1011 can be relevant to query 1001. When the value of relevance score 1030 is between 0 and 0.5, candidate document 1011 can be irrelevant to query 1001.

Figure 11:
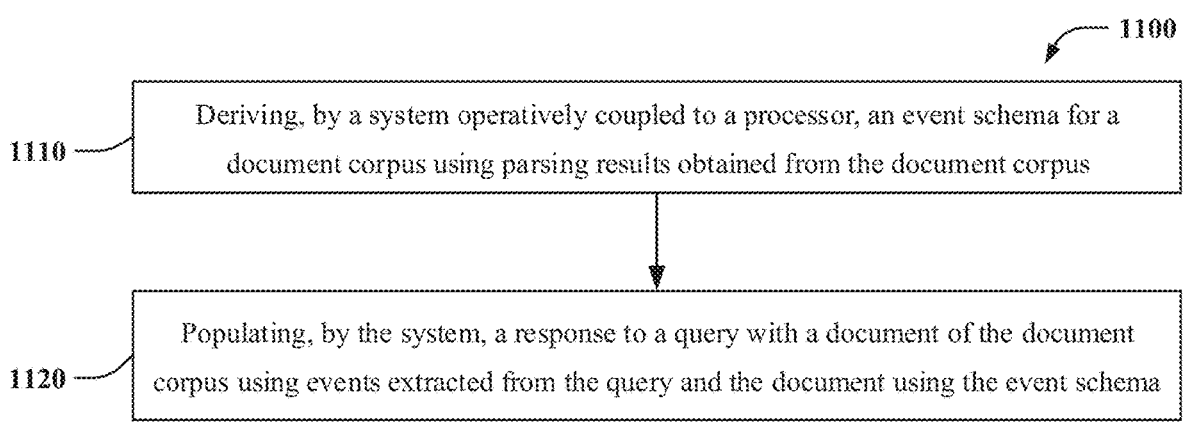
FIG. 11 illustrates a flow diagram of an example, non-limiting computer-implemented method of facilitating event schema induction from unstructured or semi-structured datasets, in accordance with one or more embodiments described herein.

FIG. 11 illustrates a flow diagram of an example, non-limiting computer-implemented method 1100 of facilitating event schema induction from unstructured or semi-structured data, in accordance with one or more embodiments described herein. Repetitive description of like elements employed in other embodiments described herein is omitted for sake of brevity. At 1110, the computer-implemented method 1100 can comprise deriving, by a system operatively coupled to a processor (e.g., with schema component 140), an event schema for a document corpus using parsing results obtained from the document corpus. In an embodiment, the system derives the event schema for the document corpus by identifying candidate event triggers and event arguments from the parsing results to form proto-events. In an embodiment, the system derives the event schema for the document corpus by generating vector representations of events using a graph neural network. In an embodiment, the system derives the event schema for the document corpus by clustering vector representations of events into a plurality of clusters to identify event types.

At 1120, the computer-implemented method 1100 can comprise populating, by the system (e.g., with retrieval component 150), a response to a query with a document of the document corpus using events extracted from the query and the document using the event schema. In an embodiment, the events extracted from the query and the document include an extracted event that comprises a list of tuple representations. In an embodiment, a tuple representation in the list of tuple representations is a vector formed by concatenating respective vector representations of an event type, an event trigger, an argument, and an argument role.

In an embodiment, the computer-implemented method 1100 can further comprise extracting, by the system (e.g., with extraction component 160), the events from the query and the document of the document corpus using the event schema. In an embodiment, the computer-implemented method 1100 can further comprise adjusting, by the system (e.g., with feedback component 170), the event schema based on user feedback data obtained from usage logs.

Figure 12:
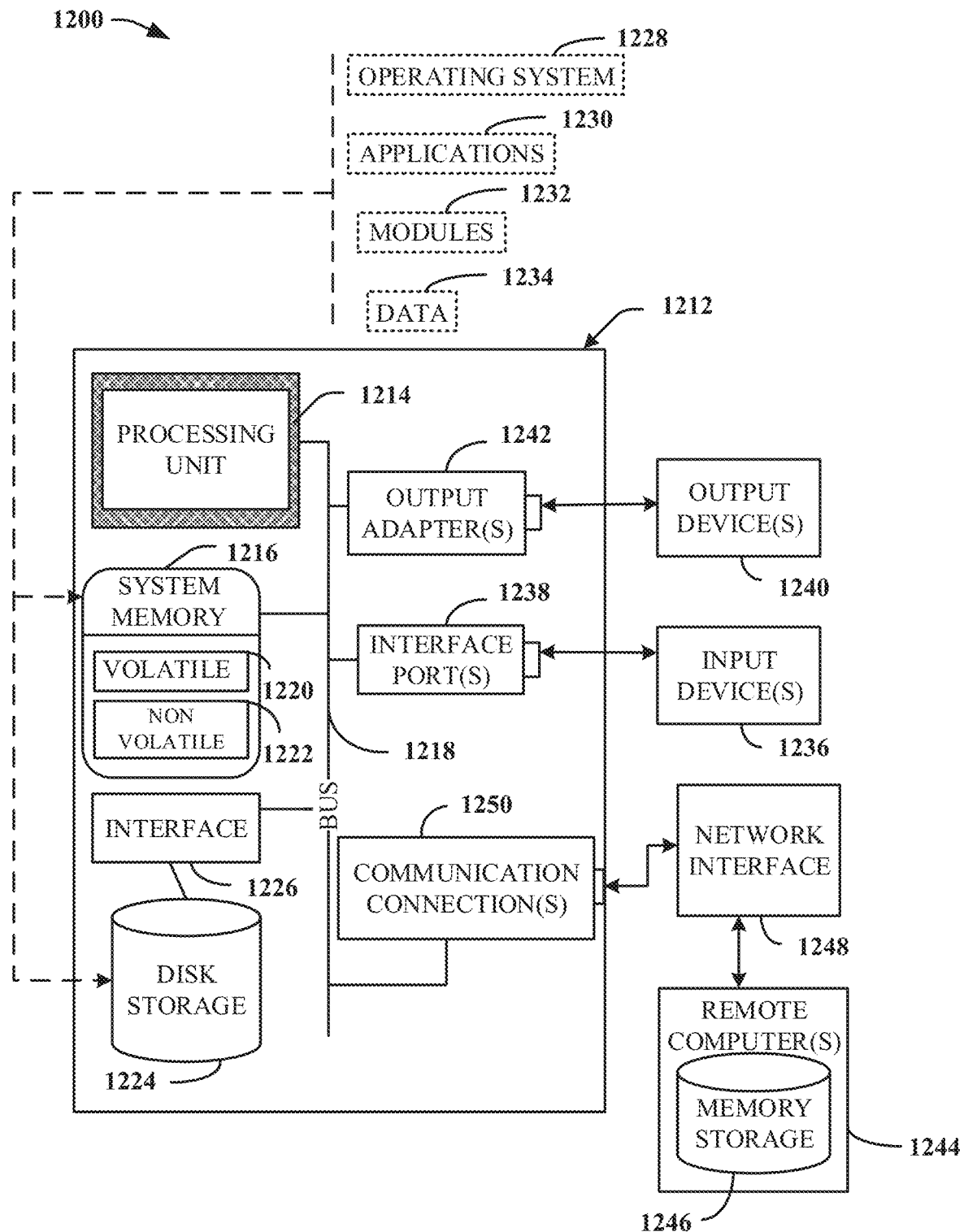
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/nonvolatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It can be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor-based appliance, a peer device or other common network node and the like, and typically can also include many or the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer-executable components stored in memory, wherein the computer executable components comprise:
   a schema component that derives an event schema for a document corpus using parsing results obtained from the document corpus; and
   a retrieval component that populates a response to a query with a document of the document corpus using events extracted from the query and the document using the event schema, wherein the events extracted from the query and the document include an extracted event that comprises a list of tuple representations, and wherein a tuple representation in the list of tuple representations is a vector formed by concatenating respective vector representations of an event type, an event trigger, an event argument, and an argument role.

2. The system of claim 1, further comprising:
an extraction component that extracts the events from the query and the document of the document corpus using the event schema.

3. The system of claim 2, wherein the extraction component assigns a weight to an extracted event based on a usage frequency of the extracted event by the retrieval component, a context in which the extracted event appears, or a combination thereof.

4. The system of claim 1, wherein the schema component derives the event schema for the document corpus by identifying candidate event triggers and event arguments from the parsing results to form proto-events.

5. The system of claim 1, wherein the schema component derives the event schema for the document corpus by generating vector representations of events using a graph neural network.

6. The system of claim 1, wherein the schema component derives the event schema for the document corpus by clustering vector representations of events into a plurality of clusters to identify event types.

7. The system of claim 1, further comprising:
a feedback component that adjusts the event schema based on feedback data obtained from usage logs.

8. The system of claim 1, wherein the parsing results are obtained using a parser.

9. A computer-implemented method, comprising:
deriving, by a system operatively coupled to a processor, an event schema for a document corpus using parsing results obtained from the document corpus; and
populating, by the system, a response to a query with a document of the document corpus using events extracted from the query and the document using the event schema, wherein the events extracted from the query and the document include an extracted event that comprises a list of tuple representations, and wherein a tuple representation in the list of tuple representations is a vector formed by concatenating respective vector representations of an event type, an event trigger, an event argument, and an argument role.

10. The computer-implemented method of claim 9, further comprising:
extracting, by the system, the events from the query and the document of the document corpus using the event schema.

11. The computer-implemented method of claim 9, wherein the system derives the event schema for the document corpus by identifying candidate event triggers and event arguments from the parsing results to form proto-events.

12. The computer-implemented method of claim 9, wherein the system derives the event schema for the document corpus by generating vector representations of events using a graph neural network.

13. The computer-implemented method of claim 9, wherein the system derives the event schema for the document corpus by clustering vector representations of events into a plurality of clusters to identify event types.

14. The computer-implemented method of claim 9, further comprising:
adjusting, by the system, the event schema based on feedback data obtained from usage logs.

15. A computer program product comprising a computer readable storage medium having program instructions embodied therewith, the program instructions executable by a processor to cause the processor to:
derive, by the processor, an event schema for a document corpus using parsing results obtained from the document corpus; and
populate, by the processor, a response to a query with a document of the document corpus using events extracted from the query and the document using the event schema, wherein the events extracted from the query and the document include an extracted event that comprises a list of tuple representations, and wherein a tuple representation in the list of tuple representations is a vector formed by concatenating respective vector representations of an event type, an event trigger, an event argument, and an argument role.

16. The computer program product of claim 15, wherein the processor derives the event schema for the document corpus by identifying candidate event triggers and event arguments from the parsing results to form proto-events.

17. The computer program product of claim 15, wherein the processor derives the event schema for the document corpus by generating vector representations of events using a graph neural network.

18. The computer program product of claim 15, wherein the processor derives the event schema for the document corpus by clustering vector representations of events into a plurality of clusters to identify event types.

19. The computer program product of claim 15, wherein the processor adjusts the event schema based on feedback data obtained from usage logs.

20. The computer program product of claim 15, wherein the parsing results are obtained using a parser.

* * * * *